United States Patent
Knechtel et al.

(10) Patent No.: US 7,748,043 B2
(45) Date of Patent: Jun. 29, 2010

(54) METHOD FOR AUTHENTICATING, IN PARTICULAR, SOFTWARE COMPONENTS THAT CAN BE LOADED INTO A CONTROL UNIT OF A MOTOR VEHICLE

(75) Inventors: Harry Knechtel, Berglern (DE); Marco Hofmann, Munich (DE); Burkhard Kuhls, Stadtbergen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1213 days.

(21) Appl. No.: 11/324,219

(22) Filed: Jan. 4, 2006

(65) Prior Publication Data

US 2006/0143474 A1    Jun. 29, 2006

Related U.S. Application Data

(63) Continuation of application No. PCT/EP2004/006776, filed on Jun. 22, 2004.

(30) Foreign Application Priority Data

Jul. 4, 2003    (DE)    ................... 103 30 439
Nov. 19, 2003    (DE)    ................... 103 54 107

(51) Int. Cl.
    H04L 9/32    (2006.01)
(52) U.S. Cl. ................... 726/26; 726/27; 713/187; 713/189
(58) Field of Classification Search ............. 726/26–27, 726/30–33; 713/165, 168, 189, 192–194, 713/187; 705/57–59
See application file for complete search history.

(56) References Cited

U.S. PATENT DOCUMENTS 4,685,055 A * 8/1987 Thomas ................... 705/56

4,868,877 A * 9/1989 Fischer ................... 713/157

(Continued)

FOREIGN PATENT DOCUMENTS

DE    10008973 A1    9/2001

(Continued)

OTHER PUBLICATIONS

Menezes et al: "Handbook of Applied Cryptography" Handbook of Applied Cryptography, CRC Press Series on Discrete Mathematics and Its Applications, Boca Raton, FL, CRC Press, US, 1997, pp. 559-561, XP002148724.

(Continued)

*Primary Examiner*—Hosuk Song
(74) *Attorney, Agent, or Firm*—Crowell & Moring LLP

(57) ABSTRACT

A method for authenticating a software package, which is provided by a software supplier and which contains a software component that can be loaded into a terminal. The software component is provided with a first authentication suffix, which is verified in order to carry out an authenticity test in the terminal. A higher-level authenticating site is provided, performing authenticating measures on the software package to increase security, wherein the measures performed by the higher-level authenticating site include providing the software package with at least one second authentication suffix instead of the first authentication suffix after successful checking of the software package provided by the software provider and including the first authentication suffix in addition to the software component of the software package.

13 Claims, 1 Drawing Sheet

U.S. PATENT DOCUMENTS

2002/0023223 A1    2/2002    Schmidt et al.
2002/0120856 A1    8/2002    Schmidt et al.

FOREIGN PATENT DOCUMENTS

| DE | 10131394 A1 | 2/2003 |
| --- | --- | --- |
| DE | 10140721 A1 | 3/2003 |
| DE | 10141737 C1 | 4/2003 |
| WO | WO02/065696 A1 | 8/2002 |

OTHER PUBLICATIONS

Adams C. et al: "Internet X.509 Public Key Infrastructure- Data Validation and Certification Server Protocols" Feb. 2001, XP002235347, p. 4.

International Search Report dated Nov. 15, 2004 (Six (6) Pages).

German Search Report dated Jun. 8, 2004 (Four (4) Pages) Including English translation of relevant portion.

\* cited by examiner

METHOD FOR AUTHENTICATING, IN PARTICULAR, SOFTWARE COMPONENTS THAT CAN BE LOADED INTO A CONTROL UNIT OF A MOTOR VEHICLE

The present application is a continuation of International Patent Application No. PCT/EP2004/006776, filed Jun. 22, 2004, and claims priority under 35 U.S.C. §119 to German Application No. 103 30 439.8, filed Jul. 4, 2003, and German Application No. 103 54 107.1, filed Nov. 19, 2003. The entire disclosure of the aforementioned documents is herein expressly incorporated by reference.

BACKGROUND AND SUMMARY OF THE INVENTION

The present invention relates to a method for authenticating a software package supplied by a software provider, containing a software component loadable into a terminal, the software component being provided with an authentication suffix, which may be verified to perform an authentication check in the terminal. A higher-level authenticating site may be provided that performs authenticating measures on the software package to increase security.

Such a method is described in German Patent DE 101 40 721 A1, for example, for providing software for use by a control unit in a motor vehicle. The basic task of such authentication methods is to ensure that no unauthorized and/or harmful software components are loaded into a software-controlled terminal. This problem is of great urgency in the automotive field in particular, because modern vehicles are equipped with a plurality of software-controlled control units, the correct functioning of which is a prerequisite for safe operation of a vehicle. Loading unauthorized software may constitute a considerable safety risk. Furthermore, many performance and/or comfort features of modern vehicles are software based.

In other words, vehicles are equipped with hardware suitable for a high level of performance and/or comfort, but the hardware is controlled by the software individually according to customer specifications, and optionally as a billable function. The corresponding software may be loaded either individually into the corresponding control units or preinstalled software may be activated individually, e.g., by loading so-called release codes. Substantial economic loss may be incurred by the vehicle manufacturers as a result of unauthorized loading and/or release of software, if it is done without payment of the required fees. On the other hand, the work-sharing industrial and social structure requires outsourcing of many essential tasks to suppliers, workshops, etc., so an authentication system is necessary to ensure strict control of the implementation of software in terminals on the one hand, while also permitting the required flexibility for a customer-friendly service management on the other hand.

With the known method, a software signature site, in particular, the software manufacturer, will sign the software components to be loaded, e.g., program codes and/or release codes, with a private key and will forward the software signed in this way to a higher-level authenticating site, e.g., the so-called trust center with the vehicle manufacturer. The signature of the software provider is checked and the signature is "certified" at the trust center. This "certification" is performed in the form of a suffix to a trust center certificate which contains, ill addition to a signature prepared using a private key of the trust center, preferably, the public key of the software provider and one or more validity restrictions for the software component.

When loading the software component, the trust center signature is first checked by using a public key for the trust center stored in the terminal. With the help of the public key that has been provided by the software provider, its signature is checked and any encoded areas of the software package are decoded. Finally, the software component is installed, taking into account the validity restrictions transmitted with the trust center certificate.

This method has the disadvantage that each terminal must be capable of processing both the signatures/certificates of the trust center as well as those of the software provider. With the multitude of different terminals from different manufacturers and an equally large number of different software providers, this requires an enormous complexity in the design of each terminal. Or, on the other hand, it requires a technical link to certain suppliers which can thereby secure for themselves a de facto supplier monopoly by creating their own standards.

Therefore, it is an object of the present invention to improve upon a generic authentication method so that the flexibility of the system as a whole is increased without any sacrifice in terms of security, and the design of individual system components is simplified.

This object may be achieved, in part, because the measures implemented by a higher-level authenticating site include providing a software package with at least one second authentication suffix instead of a first authentication suffix, after successful testing of the software package supplied by a software provider and comprising a first authentication suffix in addition to a software component. This means that the particular terminals are released from the task of having to interpret and take into account the authentication suffixes, e.g., signatures and/or certificates of the software provider. Instead of the usual "certification" of certificates, signatures, etc. of the software providers, these are replaced according to the present invention by authentication suffixes issued centrally, e.g., by the trust center. Therefore, the terminals need only be compatible with the signature and/or certification method used by the trust center and accordingly may be designed to be simpler than in the past. At the same time, however, this does not result in a security gap, because the central authentication suffix is not issued until after the authentication suffixes of the software provider have been checked. This also offers the possibility of responding quickly to changes in authorization of individual software providers for providing software.

It should be noted that the terms "replace" and "instead of" an authentication suffix refer here to a functional replacement. This is preferably, but not necessarily, associated with a physical replacement of the corresponding data in the software package. The inventive task is also fulfilled, however, by setting up the system as a whole, so that when the software component is loaded into the terminal, only the authentication suffixes of the trust center are taken into account and the authentication suffixes of the software provider that have already been checked by the trust center are ignored.

As mentioned above, the inventive method offers the possibility that checking of the software package by the higher-level authenticating site may include checking the current authorization of the software provider for providing software components. In an exemplary refinement of the inventive method, this option is in fact implemented.

In an exemplary embodiment of the present invention, the method is designed according to the PKI concept (PKI=public key infrastructure). It is possible to provide here for the first authentication suffix of the software package provided by the software provider to be encoded at least partially with a key that is a private key for this provider and can be decoded with a public key known to the higher-level authenticating site. This corresponds to signing or certifying under the known PKI concept. The public key of the software provider may be transmitted to the higher-level authenticating site within the context of a certificate or brought to the attention of same by another method so that instead of a certificate, a simple signing by the software provider is sufficient.

In a logical refinement of the PKI concept, it is possible in an embodiment of the inventive method for the at least second authentication suffix to be encoded by the higher-level authenticating site using at least partially a key that is private for this site and can be decoded using a public key known in the terminal. Here again, if there is no encryption for confidentiality reasons, the public key may be transmitted by way of a certificate. On the other hand, it is also possible to store the public key in an inaccessible memory area of the terminal, i.e., protected by confidentiality.

The basic idea of the inventive method allows a high measure of flexibility. In particular, it is possible to create an authentication hierarchy within the higher-level authenticating site. Thus, in an advantageous embodiment, for example, it is possible for the software package to be provided with multiple authentication suffixes in succession by the higher-level authenticating site, in which an authentication suffix with which the software package has been provided at an earlier point in time is used to perform an authentication check prior to subsequently providing the software package with an authentication suffix. This allows, for example, a system of signing and "certifying," which may be designed in two or more steps, within the higher-level authenticating site.

If such a hierarchically structured authentication concept is used, it is advantageous if an authentication check using multiple authentication suffixes of the higher-level authenticating site is performed when loading the software component into the terminal and/or when executing the software component in the terminal. In other words, this means that the multistage authentication can be implemented and/or verified in the terminal, but as a positive effect of the present invention, only compatibility with the signature and/or certification methods used by the higher-level authenticating site is required.

As already mentioned above, there is the possibility that an authentication suffix appended by the higher-level authenticating site may contain data based on a restriction of the functionality of the software component in question. In the case of an advantageous embodiment of the inventive method, this option is in fact implemented. The restrictions on functionality or validity may pertain to the release of certain applications and optionally even version states of the particular applications. In addition, individualization is also possible based on the vehicle (e.g., via the vehicle identification number) or certain vehicle models and/or one or more control units or types of control units (e.g., via a control unit number), based on individual persons (e.g., via an individualized chip card, e.g., integrated into the vehicle key) or via a GSM card in the vehicle telephone. In addition, temporary restrictions on validity may also be incorporated. Examples include limited validity for a certain period of time, for a certain number of hours of operation, a certain number of kilometers or (application specific) a certain number of function retrievals. In addition, selective validity restrictions may also be provided, i.e., application-specific restrictions in the sense of a demo version or a version having a reduced function scope. Finally, there is also the possibility of a regional restriction on validity which may be coupled to the current location of a vehicle. Such restrictions on validity and/or functionality are effective in particular when the terminal does not perform a validity check or does so not only at the time of the initial loading of the software components but must also perform it repeatedly during subsequent operation. A Boolean linkage of multiple validity restrictions is, of course, also possible.

The software components to be loaded into the terminal may contain, for example, program codes and/or release codes for program codes installed in the terminal.

As already indicated above, the terminal is preferably a control unit in a motor vehicle, where the term "control unit" is understood to refer to control units in the actual sense for triggering certain vehicle components as well as other convenience equipment, such as navigation systems or information systems.

Other objects, advantages and novel features of the present invention will become apparent from the following detailed description of the invention when considered in conjunction with the accompanying drawing.

DETAILED DESCRIPTION OF THE EXEMPLARY EMBODIMENTS

Figure 1:
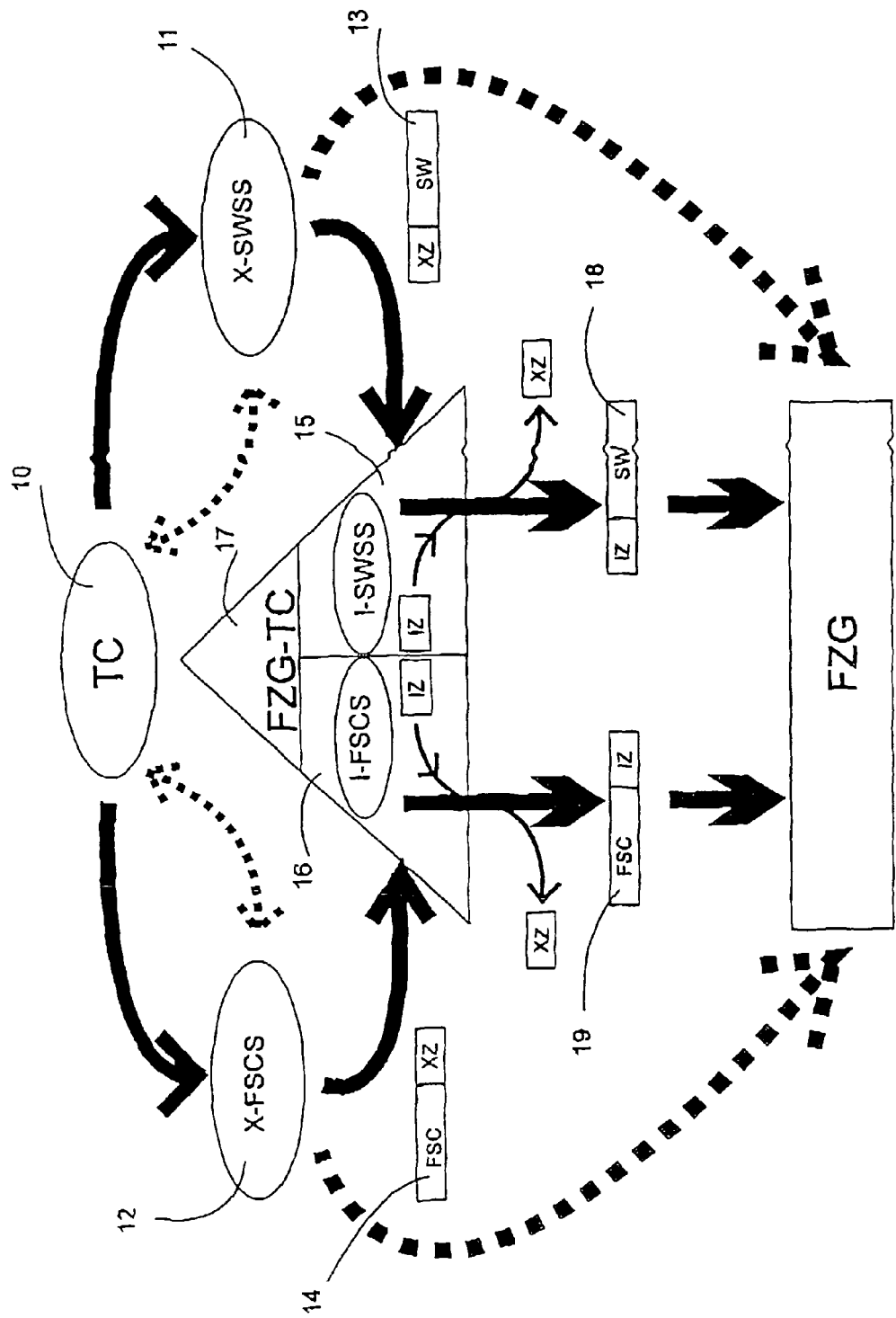
FIG. 1 illustrates a block diagram of an authentication infrastructure for implementing the inventive method.

FIG. 1 shows an infrastructure, such as that which is suitable in particular for implementing an embodiment of the inventive method in application for the management of software which is provided in particular for operation of control units in motor vehicles (FZG). The information pathways in methods according to the state of the art are depicted with dotted lines.

A central site of the infrastructure according to the state of the art is the so-called trust center (TC) 10 which is usually under the direct control of the vehicle manufacturer The TC 10 is involved in an exchange of information with external software providers' sites. These sites may include, for example, external software signature sites (X-SWSS) 11, usually with an external software manufacturer that produces software (SW) in the form of program instructions for control units, for example. FIG. 1 also shows the possibility that it is an external release code site (X-FSCS) 12 which provides release codes (FSC) for software that has already been used. The general term "software component" used here includes both FSCs and program instructions and other software loadable into the terminal.

According to the state of the art, the software components are signed by the external providers, e.g., by generating a signature and/or a certificate. These and similar signing results are referred to here, in general, as "authentication suffixes," because they are suitable for checking on the origin and integrity of the software so treated in an authentication check. According to their origin from an external provider, they are labeled as "XZ" in FIG. 1. The authentication suffixes are checked by the TC 10 according to the state of the art, and, if the check is successful, they are confirmed by attaching an additional signature and/or an additional certificate. The software components thereby signed and "certified" may be loaded into a control unit in a motor vehicle, whereby both the authentication suffixes of TC 10 and those of X-SWSS 11 or X-FSCS 12 may be checked, each by the method specifically used for this purpose.

An exemplary method according to the present invention is represented by solid arrows in FIG. 1. Accordingly, X-SWSS 11 and/or X-FSCS 12 supply software packages 13 and 14, respectively, each consisting of SW and/or FSC and authentication suffix XZ to internal software signature sites (I-SWSS) 15 and/or internal release code sites (I-FSCS) 16. The internal sites I-SWSS 15 and I-FSCS 16 may be only under the control of the automobile manufacturer and may be part of a hierarchically structured vehicle trust center FZG-TC 17, for example.

The internal sites I-SWSS 15 and I-FSCS 16 check the authentication suffixes XZ of the external sites X-SWSS 11 and X-FSCS 12 and may perform an adjustment with an internal database where, for example, information about the current authorization of the external sites 11 and 12 to provide software components is stored. The external authentication suffixes XZ are replaced by internal authentication suffixes IZ when a successful check is performed. This may be done by physically replacing the corresponding memory contents.

This results in modified software packages 18 and/or 19, containing, in addition to SW and/or FSC, an internal authentication suffix IZ which is checked in loading the software component into the control unit of the vehicle FZG and/or repeatedly during operation of the control unit. In particular, the internal authentication suffixes IZ may additionally contain information about restrictions on validity of the software components.

This achieves the result that a control unit need only be compatible with the authentication methods used by the internal sites and need not be capable of processing the authentication methods used by external sites, as has been the case in the past.

In particular, the inventive method may take place automatically, in which case the software components to be signed/certified are sent online to an internal server, which performs an authentication check and redistributes the resigned/recertified software packages, e.g., to service stations, production sites, online centers, etc. for transmission to the particular control units provided for this purpose.

The embodiment described here of course involves only a specific, especially advantageous exemplary embodiment of the present invention. A plurality of possible modifications are available to those skilled in the art within the scope of the present invention. In particular, the concrete structure of the internal authentication suffixes IZ, their hierarchical generation, if necessary, and their specific interpretation in a control unit may be the object of a variety of embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authentication of a software package provided by a software provider, containing a software component loadable into a terminal, the software component being provided with a first authentication suffix which is checked in the terminal for performing an authenticity check, whereby a higher-level authenticating site is provided, performing authenticating measures on the software package to increase security, wherein the measures performed by the higher-level authenticating site comprise the act of:

providing the software package with at least one second authentication suffix instead of the first authentication suffix after successful checking of the software package provided by the software provider and including the first authentication suffix in addition to the software component of the software package, wherein the authentication of the software package by the higher-level authenticating site includes a check of the current authorization of the software provider to provide the software components.

2. The method as recited in claim 1, wherein the first authentication suffix of the software package provided by the software provider is at least partially encoded using a private key and is decodable using a public key known to the higher-level authenticating site.

3. The method as recited in claim 1, wherein the at least one second authentication suffix is encoded at least partially using a private key by the higher-level authenticating site and is decodable using a public key known in the terminal.

4. The method as recited in claim 1, wherein the software package is provided with a plurality of authentication suffixes in succession by the higher-level authenticating site, whereby an authentication suffix with which the software package has been provided at an earlier point in time is used for performing an authenticity check prior to providing the software package with a subsequent authentication suffix.

5. The method as recited in claim 1, wherein the software component includes program codes and release codes for program codes installed in the terminal.

6. The method as recited in claim 1, wherein the terminal is a control unit in a motor vehicle.

7. A method for authentication of a software package provided by a software provider, containing a software component loadable into a terminal, the software component being provided with a first authentication suffix which is checked in the terminal for performing an authenticity check, whereby a higher-level authenticating site is provided, performing authenticating measures on the software package to increase security, wherein the measures performed by the higher-level authenticating site comprise the act of:

providing the software package with at least one second authentication suffix instead of the first authentication suffix after successful checking of the software package provided by the software provider and including the first authentication suffix in addition to the software component of the software package, wherein the software package is provided with a plurality of authentication suffixes in succession by the higher-level authenticating site, whereby an authentication suffix with which the software package has been provided at an earlier point in time is used for performing an authenticity check prior to providing the software package with a subsequent authentication suffix, wherein an authenticity check is performed using multiple authentication suffixes of the higher-level authenticating site in loading the software component into the terminal or in executing the software component in the terminal.

8. A method for authentication of a software package provided by a software provider, containing a software component loadable into a terminal, the software component being provided with a first authentication suffix which is checked in the terminal for performing an authenticity check, whereby a higher-level authenticating site is provided, performing authenticating measures on the software package to increase security, wherein the measures performed by the higher-level authenticating site comprise the act of:

providing the software package with at least one second authentication suffix instead of the first authentication suffix after successful checking of the software package provided by the software provider and including the first authentication suffix in addition to the software component of the software package, wherein the software package is provided with a plurality of authentication suffixes in succession by the higher-level authenticating site, whereby an authentication suffix with which the software package has been provided at an earlier point in time is used for performing an authenticity check prior to providing the software package with a subsequent authentication suffix, wherein an authenticity check is performed using multiple authentication suffixes of the higher-level authenticating site in loading the software component into the terminal and in executing the software component in the terminal.

9. A method for authentication of a software package provided by a software provider, containing a software component loadable into a terminal, the software component being provided with a first authentication suffix which is checked in the terminal for performing an authenticity check, whereby a higher-level authenticating site is provided, performing authenticating measures on the software package to increase security, wherein the measures performed by the higher-level authenticating site comprise the act of:

providing the software package with at least one second authentication suffix instead of the first authentication suffix after successful checking of the software package provided by the software provider and including the first authentication suffix in addition to the software component of the software package, wherein an authentication suffix appended by the higher-level authenticating site includes data based on a restriction of the functionality of the software component.

10. The method as recited in claim 9, wherein the software component includes program codes and release codes for program codes installed in the terminal.

11. The method as recited in claim 9, wherein the restriction of the functionality of the software component includes a temporary restriction on validity.

12. The method as recited in claim 9, wherein the restriction of the functionality of the software component includes selective validity restrictions.

13. The method as recited in claim 9, wherein the restriction of the functionality of the software component includes a regional restriction on validity.

* * * * *